(12) United States Patent
Simon (10) Patent No.: US 9,858,043 B2
(45) Date of Patent: Jan. 2, 2018

(54) SERVICE-ORIENTED PROCESS CONFIGURATION SYSTEMS AND/OR METHODS

(75) Inventor: Katrina Simon, St. Ingbert (DE)

(73) Assignee: SOFTWARE AG, Darmstadt (DE)

( * ) Notice: Subject to any disclaimer, the term of this patent is extended or adjusted under 35 U.S.C. 154(b) by 500 days.

(21) Appl. No.: 12/976,141

(22) Filed: Dec. 22, 2010

(65) Prior Publication Data

US 2012/0166246 A1  Jun. 28, 2012

(51) Int. Cl.
*G06F 9/44* (2006.01)
*G06Q 10/06* (2012.01)

(52) U.S. Cl.
CPC ......... *G06F 8/10* (2013.01); *G06Q 10/06316* (2013.01)

(58) Field of Classification Search
USPC .................................... 705/348, 7.27, 7.11
See application file for complete search history.

(56) References Cited

U.S. PATENT DOCUMENTS

| | | | |
|---|---|---|---|
| 7,703,071 B2* | 4/2010 | Kuester et al. | 717/104 |
| 7,818,283 B1 | 10/2010 | Bajpay et al. | |
| 8,046,733 B2* | 10/2011 | Weber | 717/104 |
| 2007/0179828 A1 | 8/2007 | Elkin et al. | |
| 2007/0266377 A1 | 11/2007 | Ivanov | |
| 2009/0249281 A1* | 10/2009 | Fritzsche et al. | 717/104 |
| 2009/0265684 A1* | 10/2009 | Fuchs et al. | 717/105 |
| 2010/0191555 A1 | 7/2010 | Shmul | |
| 2011/0029947 A1* | 2/2011 | Markovic | 717/102 |
| 2011/0265060 A1* | 10/2011 | Fritzsche et al. | 717/104 |

FOREIGN PATENT DOCUMENTS

CN  101398852  4/2009

OTHER PUBLICATIONS

Jan vom Brooke, "Service-Oriented Architectures—SOAs: Management and Controlling of Business Processes," pp. 55-74, Copyright 2008 [original and translation].

(Continued)

*Primary Examiner* — Mark A Fleischer
(74) *Attorney, Agent, or Firm* — Nixon & Vanderhye, P.C.

(57) ABSTRACT

Certain example embodiments described herein relate to techniques for matching business requirements with available services in service-oriented business process systems. An n-to-m relationship between process steps and services may be established. In certain example embodiments, both future design and dynamic runtime changes become possible by elaborating on possible resolution techniques before process execution and by identifying/resolving configurational dependencies. The addition of a service-oriented process configuration layer is made possible in certain example embodiments by enhancing the way that business processes are modeled visually or notationally, and through the implementation of a metamodel. The model linking process steps and services may be extended so as to support logical operators, rules or constraints for matching process steps and services, dependencies and relationships, etc. A meta model may be provided so as to provide support for evaluating or analyzing matches, sometimes automatically, at either or both of runtime and design time.

28 Claims, 8 Drawing Sheets

(56) References Cited

OTHER PUBLICATIONS http://www.oracle.com/technetwork/middleware/bpel/overview/ds-bpel-11gr1-1-134826.pdf, Oracle SOA Suite: BPEL Process Engine/Human Workflow, retrieved Dec. 22, 2010.
http://www.oracle.com/technetwork/middleware/bpa/overview/oracle-bpasuite-11-datasheet-1-130499.pdf, Oracle BPA Suite, retrieved Dec. 22, 2010.
http://www.softwareag.com/us/Images/SAG_BPMS_FS_Apr10-web_tcm89-33867.pdf, WebMethods BPMS, retrieved Dec. 22, 2010.
http://www.ids-scheer.de/de/ARIS/ARIS_Platform/ARIS_SOA_Architect/7784.html, ARIS SOA Architect, retrieved Dec. 22, 2010.
http://www.pega.com/Products/SmartBPM-business-rules.asp, PegaSystems BPMS, retrieved Dec. 22, 2010.
Ryusuke Masuoka et al., "Task Computing—The Semantic Web Meets Pervasive Computing," Jan. 1, 2003, pp. 866-881, XP-002486064.
Event-Driven Process Chain. Wikipedia. Oct. 27, 2010. XP-002628850. http://en.wikipedia.org/w/index.php?title=Event-driven_process_chain.
Lee, J.; Park, M. S..(2003): Integration and composition of web service-based business processes. In: Journal of Computer Information Systems, pp. 82-92, retrieved from http://www.allbusiness.com/technology/computer-software-programing/1151342-1.html, on Feb. 8, 2011.
Agrawal, A. et al. (2007a): Web Services Human Task (WS-HumanTask), Version 1.0.—URL retrieved from http://incubator.apache.org/hise/WS-HumanTask v1.pdf, on Feb. 8, 2011.
Yu, T.; Lin, K.-J. (2005): Service selection algorithms for web services with end-to-end QoS constraints. In: Information Systems and e-Business Management, vol. 3, No. 2, pp. 103-126.
TEXO Infrastructure for Internet-Based Services, retrieved from http://www.theseus-programm.de/anwendungsszenarien/texo/default.aspx (translation), on Feb. 8, 2011.

* cited by examiner

SERVICE-ORIENTED PROCESS CONFIGURATION SYSTEMS AND/OR METHODS

FIELD OF THE INVENTION

Certain example embodiments described herein relate to service-oriented business process systems (SO-BPSs). More particularly, certain example embodiments described herein relate to techniques for matching business requirements with available services, e.g., in connection with a realistic n-to-m relationship therebetween. In certain example embodiments, it becomes possible to distinguish between diverse configurational operators and to elaborate on possible resolution techniques before process execution, including identifying and resolving configurational dependencies between service matches, thereby supporting both future designs and dynamic changes at runtime.

BACKGROUND AND SUMMARY OF EXAMPLE EMBODIMENTS OF THE INVENTION

A business process is a continuous series of enterprise tasks, undertaken to help create valuable output for an internal or external customer. A business process gives organizational actions structure across time, place, and/or functions. Business processes in general represent one way to describe, analyze, execute, and/or control operational structures across departments, business units, and/or even business partners. Business process management (BPM) relates to, inter alia, the continuous improvement of business processes, e.g., for the sake of overall business success. Amongst others, software-enabled business process automation is an instrument that may help increase efficiency and effectiveness of process execution. Business process models have been established to specify processes within BPM projects. For automation purposes, for example, business process models may help document and structure conceptual process requirements (business view) prior to their transformation into executable (code-based) specifications (technical view). Both modeling and transformation are typically involved in sound process automation.

With respect to business process modeling, it is noted that business process models typically describe the logical and timely flow of a business process in a map. They may, for example, help visualize process activities as graphical symbols and connect them to a linear order. Logical operators may indicate when the flow splits into alternative or parallel paths, when they merge into one again, etc. This so-called control flow typically is at the core of each business process model. It may be complemented by additional model elements that differ depending on the perspective. For instance, a conceptual-organizational perspective (business view) may target the organizational process context including intra- and inter-organizational division of labor, interaction between human activities, their technical support, product outcome, etc. The modeling language event-driven process chain (EPC) has prevailed as a de facto standard for such conceptual business processes. It complements process activities (business process steps) by organizational resources responsible, input required, output produced, etc., supporting software application systems, organizational objectives, risks, etc. While being rather easy to use even by non-technical process analysts, it does include important information on the logical flow, which makes it a semi-formal requirements basis for technical process implementation. It generally is at the transformation from conceptual into technical business process models where business process modeling changes the perspective from organizational design into technical engineering.

Business process transformation helps map the control flow described in a conceptual process model into a technical business process model. Here, it may be complemented by technical information, e.g., process variables for storing process information during execution, online forms for user interaction, exceptions and their handling, communication patterns (asynchronous/synchronous), consistent data exchange, etc. To make a process executable, process activities may be assigned to automated software functionality or to semi-automated user interfaces, or the like. Depending on the chosen modeling language and the targeted deployment system, this transformation may result in a second graphical diagram (e.g., BPMN 2.0, etc.) or directly into a code-based script (e.g., XPDL, BPEL, etc.). The resulting technical process models may be deployed into the process engine of a business process management system (BPMS) or workflow management system (WFMS), which allows for starting, executing, and tracking instances of the process efficiently.

Many recent transformation approaches add an intermediary model layer between conceptual process models (business view) and technical models (technical view). This so-called logical view sometimes provides notations in the technical modeling language (e.g., BPMN 2.0) but is not yet fully executable because of missing technical features. There are several advantages associated with this intermediary step. For example:

- Conceptual processes may be mapped out in different tool environments rather than technical processes. The linguistic translation task thus may be complemented by a technical synchronization. Both tasks may be kept separated as much as possible to reduce complexity.
- Conceptual processes may change more slowly than their technical implementation. Thus, there may be a benefit to a logical view that keeps track of the rather stable business requirements.
- There typically are at least three business roles involved in the transformation activities. Each of them may have its own perspective and context.
- Attempting to provide a tool-supported end-to-end solution between conceptual and technical processes may benefit from a bilateral synchronization level.

Figure 1:
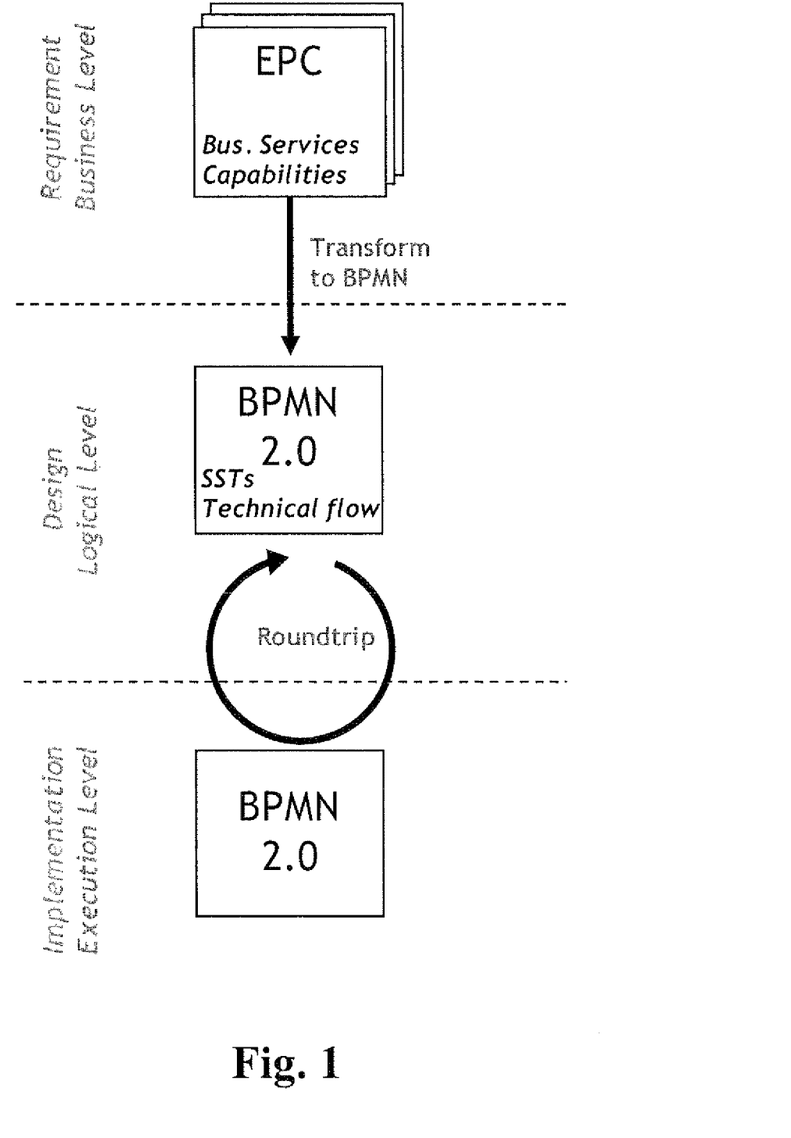
FIG. 1 is a view of the three layers of business process automation.

FIG. 1 is a view of the three layers of business process automation. As can be seen from FIG. 1, at the requirements or business layer, the EPC captures business services capabilities. The EPC is transformed to BPMN, for example, for use at the design or logical layer. Systems and services technologies (SSTs), technical flows, and/or the like may be reflected in this second layer. The SSTs, technical flows, etc., may be packaged into deployable logic at the implementation or execution level. Executables may be represented in BPMN 2.0 or the like, and there may be a "roundtrip" connection between the design and implemental levels.

The idea of using business processes as blueprint for cross-application software systems is known from the concepts of workflow management systems (WFMS) and enterprise application integration (EAI). One factor that makes business process automation a technical challenge, however, is the plethora of heterogeneous and increasingly distributed software systems used for executing parts of the process. Those automated parts often further need to be integrated and connected along a given process flow, which enables their interoperability in the context of end-to-end business process automation.

Most recently, service-oriented architectures (SOAs) meet this integration challenge by exposing and integrating remote software functionality through well-defined software service interfaces. Early proponents thought of SOA as a specific style of distributed software architectures based on the so-called "find-bind-execute" relationship between service providers and consumers. More recent notions advance this integration view towards the potential SOA offers for business process automation and therefore helped position process automation into the center of the SOA discussion. The ability to compose services loosely opens new avenues to implementing business processes flexibly following dynamic business requirements. The adoption of standardized service interfaces allows for reusing services in different business processes, as well as flexibly replacing services according to evolving business requirements. In this sense, SOA has been considered as a paradigm for organizing and utilizing distributed capabilities that may be under the control of different ownership domains. Scientific discourse and best practices of service-oriented architectures provide a number of service-oriented design principles. While the SOA approach reinforces well-established, general software architecture principles of interface-orientation, interoperability, autonomy and modularity, it also adds additional themes of process-orientation. Thus, service-oriented design helps improve business process flexibility by the separation of process structure, e.g., process flow, and process institutionalization, e.g., selection of service capabilities conducting process activities.

Distilling requirements of business process systems based on typical properties of their elements and relationships reveals a high degree of polymorphy, that is, a multitude of possible variations and instantiations. Pursuing the same process objectives, multiple instances of a business process implementation are very likely to use different approaches and resources. This balance between homogeneous process requirements and heterogeneous ways to achieve this objective among different embodiments characterizes the concept of hybrid systems. The theory of hybrid systems helps describe systems that pursue a specific goal by deploying alternative subsystems based on runtime evaluation.

The notion of hybrid systems has gained public attention in the domain of car manufacturing, where hybrid vehicles are considered vehicles that use two or more distinct energy sources or propulsion devices to move the vehicle. Hybrid electric vehicles combine internal combustion engines and electric motors to attempt to strike a balance between ecological and dynamic aspects of driving. In information systems (IS) research and related disciplines, hybridity has been attributed to specific information systems, algorithms, and computing devices, as well as of business and organizational strategies. As with the hybrid vehicle example, hybrid information systems combine different approaches, promising "the best of both worlds." This combination of distinct approaches helps ripen situational benefits and compensate for situational drawbacks. In business processes, diverse technical and human resource capabilities may also represent those alternative subsystems (socio-technical hybridity).

IS scholars generally agree on features that may be utilized to justify a classification of business process systems as hybrid systems. These attributes of those subsystems are to be combined by the hybrid system at runtime to achieve a common goal, and include:

Heterogeneous concepts that differ from each other in their characteristics or behaviors. Concepts are differentiated by certain criteria that assign properties to each concept. In a business process system, those subsystems are sub-processes or resources that provide different approaches to solve a problem or deliver a task. These sub-processes vary in their degree of automation, availability, cost, etc. (structural properties), and their modus operandi (behavioral properties).

Competitive concepts that are at odds with each other. While being heterogeneous in nature, they compete for a common cause, namely, the fulfillment of the system's purpose. In a BPS, a given process flow of activities may be institutionalized by various rivaling means. Rivalry may relate to cost, availability, expected costs, expected time a sub-process or resource promises to deliver (structural and behavioral properties), etc. To identify competing entities, their purpose is included into their property description (e.g., a purpose property).

Coexistent concepts whose dialectic forms continue to exist side-by-side, despite their apparently conflicting nature. They jointly serve a common cause while being alternated according to situational circumstances. In a BPS, diverse process resources may hold redundant capacities to deal with diverse business situations and requirements.

Each of those heterogeneous, competitive, and coexistent subsystems provides an autonomous approach to fulfill the overall BPS purpose. Opposed to this heterogeneity are homogeneous rules that coordinate subsystems in the total system. This coexistence of heterogeneity and homogeneity is an integral pattern of hybrid systems. Thus, hybridity provides a design approach to integration problems in distributed, heterogeneous information systems. Today's web-based technologies allow distributed resources to participate in a shared collaborative process. Each of those resources holds technical or human capabilities. Design methods supporting a BPS provide answers to the question as to which of those diverse and partly redundant capabilities are deployed for a specific use case. Evaluation, selection, and exchange of alternative subsystems during runtime involve an additional phase complementing traditional system design logic of design time and runtime. During this so-called configuration time, the system purpose and system alternatives are aligned by continuous adaptation interrupting runtime as little as possible. Thus, the modeling and execution of business processes are converging in those configurative design activities. They allow recognizing situational circumstances immediately.

There are a number of software vendors that market transformation functionalities of their BPMS offerings. While most of them target service-oriented process automation, it is believed that none of them considers the implications of service-oriented business process systems being hybrid systems and it is also believed that none of them provided for configurational modeling.

Current commercially available products address the issue of service configuration in different ways. In a majority of cases, it is believed that a one-to-one mapping between process steps and software services is assumed and documented already at design time (static service deployment). There are a few approaches that consider dynamic human service deployment (task assignment) at runtime, but they do not provide for configurational activities at design time, such as service matching. None of the existing products is believed to facilitate logically connecting service matches based on their contribution to the respective business process step.

It is noted that transformation (both mechanisms and governance support) from conceptual to technical process models still is considered cutting-edge technology, specifically given complexity of real-world process models and organizational settings. Only few commercially available BPMS software products offer full support. Given this limitation, they lag behind any further, more sophisticated implementation of matching business requirements with available services. If anything, they provide search functionalities for services based on functional parameters (capabilities, input/output). Not only is there no more elaborate matching functionality available (because of the lack of richer service description standards), further support for handling service matching results, their dependencies, and contribution to the business requirements, also are lacking. As for dynamic service selection, e.g., automated or manual during runtime, there is a broad support for human task-related assignments (because of the issue of task delegation in human workflows), but none for software-service deployment.

While some research approaches involve some singular concepts that contribute to closing the gap between specification of business-oriented process steps and their execution through invoking services, the inventor of the instant application is not aware of any that actually provides end-to-end support for the same. For example, although vom Brocke introduces disjunctive operators to represent logical dependencies between service matches and mentions the concept of configurational modeling, his approach fails to distinguish diverse configurational operators and to elaborate on possible resolution techniques before process execution. Indeed, it has not been integrated into a business process transformation process and, thus, it fails to connect service-oriented process configuration with the runtime of BPMS. It also does not elaborate on all possible varieties of configurational dependencies between service matches. Thus, it misses the use cases of service composition and dynamic service selection.

In general, current approaches assume a one-to-one assignment between process steps and software services, neglecting any more realistic n-to-m relationship. As a consequence, there is no support for keeping track of multiple supportive services and their logical dependencies. Missing any preceding design decisions makes it difficult to support dynamic service deployment on-the-fly.

Thus, it will be appreciated that there is a need in the art for improved service-oriented process configuration techniques, e.g., that help connect service-oriented process configuration with the runtime of BPMS. Such techniques may advantageously help keep track of multiple supportive services and their logical dependencies (e.g., in connection with a more realistic n-to-m relationship between process steps and software services) so as to support dynamic service deployment both in the future and on-the-fly.

One aspect of certain example embodiments relates to matching business requirements with available services, e.g., in connection with a more realistic n-to-m relationship therebetween.

Another aspect of certain example embodiments relates to identifying and resolving configurational dependencies between service matches so as to support both future designs and dynamic changes at runtime.

Still another aspect of certain example embodiments relates to distinguishing between diverse configurational operators and elaborating on possible resolution techniques before process execution, e.g., in the context of an integrated business process transformation process, so as to help connect service-oriented process configuration with the runtime of a BPMS.

In certain example embodiments, a method of configuring a service-oriented business process system in which business process functions, events and services are defined is provided. Business process functions are matched to services to form an extended event-driven process chain (eEPC), with each said service having an associated service capability and with each said service capability having at least one associated service resource. When multiple matches are possible for a single business process functions, the possible matches are merged in accordance with a configurational operator, with the configurational operator being one of a disjunctive operator, a conjunctive operator, and an adjunctive operator. The eEPC is converted to a service-oriented event-driven process chain (sEPC) by replacing service capabilities with the associated matching services and the associated configurational operator in accordance with integrity rules.

In certain example embodiments, a method of running a service-oriented business process system in which business process functions, events and services are defined is provided. The service-oriented business process system may be configured according to the above-described and/or other methods. When a business process function is to be triggered by a preceding event, the matching service is executed if there are no associated configurational operators and otherwise resolving which service is to be executed in dependence on the associated configuration operator.

In certain example embodiments, there are provided non-transitory computer readable storage mediums tangibly storing instructions that, when executed by at least one processor of a system, perform the above-described and/or other methods.

In certain example embodiments, the same or similar systems may be provided in addition or in the alternative to such example methods and/or storage mediums.

These aspects and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Certain example embodiments described herein relate to service-oriented business process systems (SO-BPSs). More particularly, certain example embodiments described herein relate to techniques for matching business requirements with available services, e.g., in connection with a realistic n-to-m relationship therebetween. In certain example embodiments, it becomes possible to distinguish between diverse configurational operators and to elaborate on possible resolution techniques before process execution, including identifying and resolving configurational dependencies between service matches so as to support both future designs and dynamic changes at runtime. The addition of a service-oriented process configuration layer is made possible in certain example embodiments by enhancing the way that business processes are modeled visually or notationally, and through the implementation of a metamodel. With respect to the former, it will be appreciated that the model linking process steps and services may be extended so as to support logical operators, rules or constraints for matching process steps and services, dependencies and relationships, etc. With respect to the latter, it will be appreciated that a meta model may be provided so as to provide support for evaluating or analyzing matches, sometimes automatically, at either or both of runtime and design time.

With service-oriented business process systems, design time and runtime can be expected to blur. The horizontal dimension of the framework in some cases may be understood as a continuum that does not clearly separate between design time and runtime. Activities of process specification and service identification fall under the design time category, whereas process and service execution belongs to runtime. Activities in-between can be considered "either or" depending, for example, on the respective variation of service-oriented architecture (SOA) construction. It will be appreciated that most organizations only use a static version of SOA, whereas actual services used in applications are pre-selected at design time. In this case, service composition includes only services from a service pool where all the services are pre-selected and pre-deployed. Referring to reference modeling concepts, an interim configuration phase dedicated to the institutionalization of process structures by service resource allocation, as defined by the hybrid nature of service-oriented systems, may be introduced.

Figure 2:
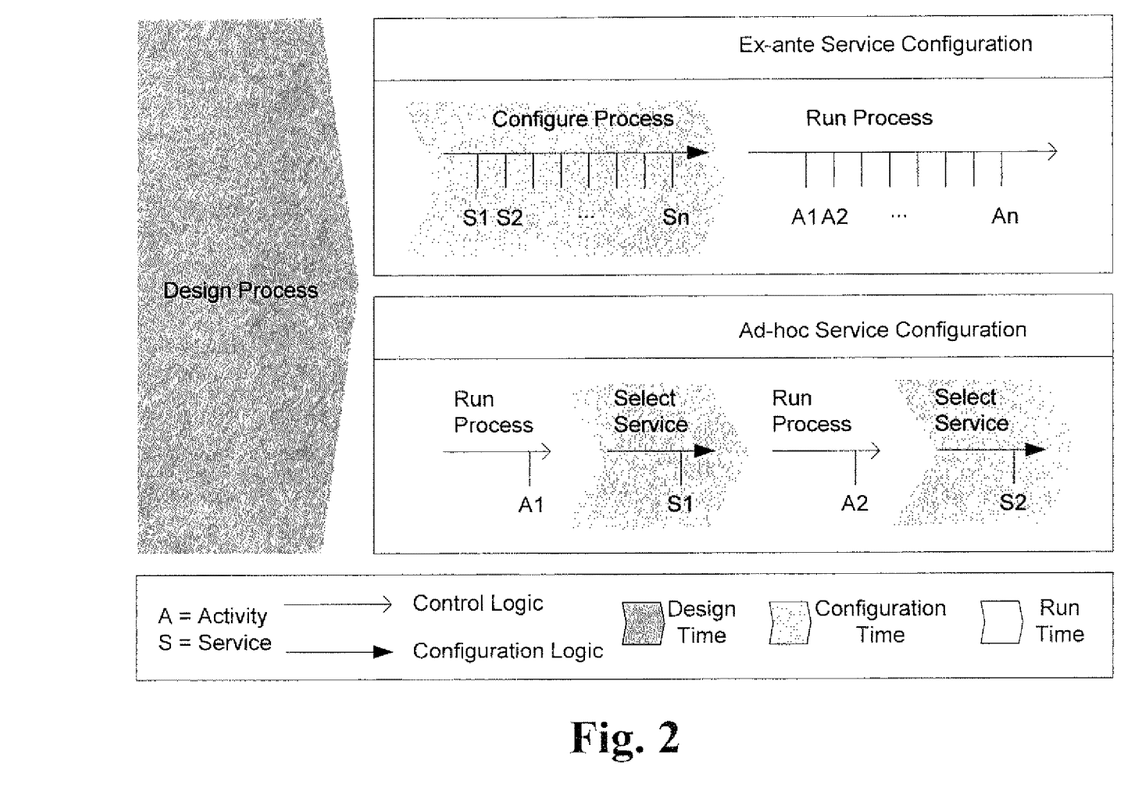
FIG. 2 shows a design process that involves both ex ante and ad hoc service configuration for a service-oriented business process system (SO-BPS)

Thus, the configuration phase includes the rational selection, composition, and allocation of services to fulfill an organizational task within a process. It underscores that service-oriented system design involves continuous decision-making on activities and services. Furthermore, one can differentiate between ex ante configuration and ad hoc configuration. The former typically occurs on the type level of the process before it is initially instantiated. The latter typically implies that when the first process instance starts, no specific selection of services has been made. Instead, each process activity is checked for its configuration logic that determines service selection in order to institutionalize this activity. FIG. 2 illustrates both options in the context of an example service-oriented business process system (SO-BPS) at configuration time.

An implementation of this configuration time into a BPM design tool would allow for a service-oriented process design that includes both the process flow and multiple service automation options available to each process steps, e.g., offered by different third-party service providers. The latter would be functionally equal but differ, e.g., in their non-functional properties. Based on situational constraints at runtime, the best service match may be selected ad hoc and the process configured and made executable accordingly.

This arrangement is shown in FIG. 2, which shows a design process which involves both ex ante and ad hoc service configuration for an SO-BPS. As a part of ex ante service configuration, it is possible to identify, configure, etc., services (S1, S2, . . . , Sn), as well as activities (A1, A2, . . . , An). The services and the activities may be separately identified, configured, etc., and the services may be matched to one or more processes ahead of runtime. By contrast, in ad hoc service configuration, a process A1 that is run may lead to the ad hoc selection of a service S1 based on configuration logic or the like which, in turn, leads to the ad hoc selection of a second process A2 that is run and which, in turn, leads to the ad hoc selection of a second service S2, etc. As shown in FIG. 2, activities generally have associated control logic, whereas services generally have associated configuration logic.

As business process transformation is structured into three levels of process structuring, process configuration and process institutionalization, it is possible to equally differentiate three categories of models. For instance, in certain example embodiments, conceptual models map socio-technical systems in terms of their business structures and operations from an organizational perspective. Technical models in certain example embodiments hold all information for their infrastructure support and may be software-oriented. Integrating both perspectives, configurational models may include shared structures and operations facilitating alignment and synchronization of conceptual and technical models. Those three levels may apply to all views of the SO-BPS architecture of certain example embodiments. Their vertical connection may help underscore the relevance of a bi-directional coupling between conceptual, configurational, and technical models. As FIG. 3 illustrates, modeling languages are selected and extended along these three levels.

Figure 3:
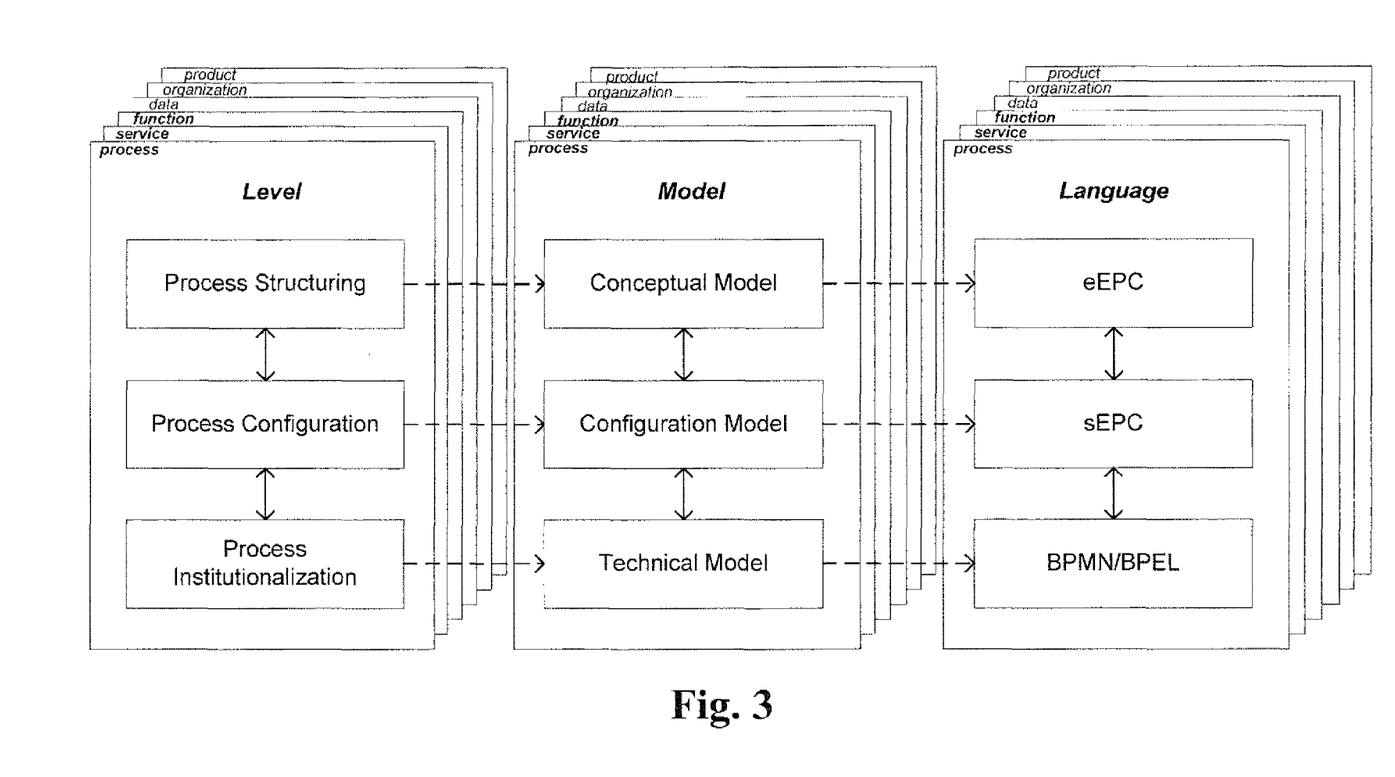
FIG. 3 shows the modeling framework of an SO-BPS architecture according to certain example embodiments.

More particularly, FIG. 3 shows the modeling framework of an SO-BPS architecture according to certain example embodiments. As indicated above, levels are organized in a stack including process structuring, process configuration, and process institutionalization. Models are similarly organized in a stack including a conceptual model, a configuration model, and a technical model. Example languages in which the models may be implemented also are shown in FIG. 3 and include extended EPC (eEPC), service-oriented EPC (sEPC), and BPMN/BPEL (although other languages of course are possible). As indicated above, links between adjacent levels, models, and languages are bi-directional. Each of the level, model, and language containers may be thought of as a stack including, for example, processes, services, functions, data, organizations, and products.

Figure 4:
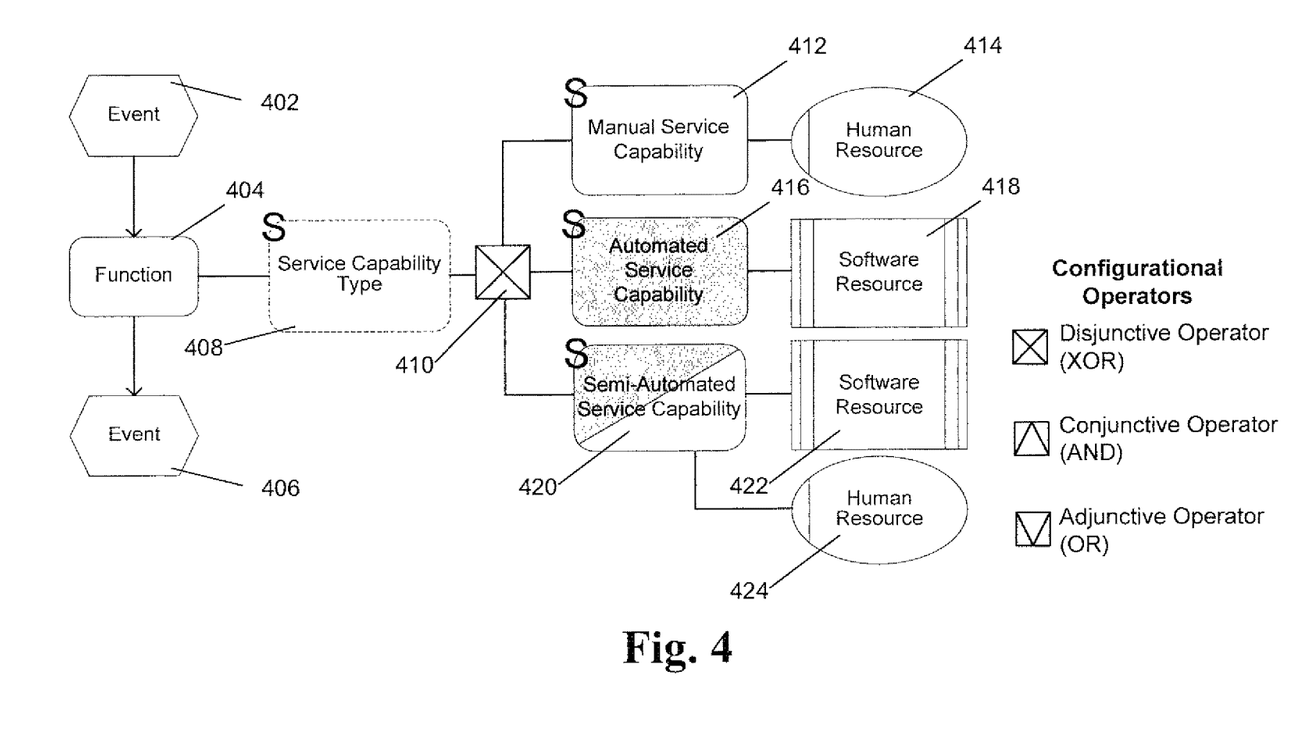
FIG. 4 is an illustrative service-oriented event-driven process chain (sEPC) in accordance with certain example embodiments.

For the purpose of configurational modeling, the eEPC language may be further extended by additional service-related artifacts to become an sEPC. As illustrated by FIG. 4, for example, they expand the process institutionalization perspective to the involved service capability types (in the sense of service candidates) and actually implemented service capabilities. Each function is assigned to a service capability type that holds requirements information (in attributes or assigned diagrams). Furthermore, it is connected to institutionalization alternatives, or diverse service implementations of this service capability. Alternative service implementations may be connected with different configuration operators. A disjunctive operator (XOR) signifies that each of the service alternatives fully matches with the service requirements, in that they represent exclusive alternatives. An adjunctive operator (OR) implies that the service alternatives partially match and may complement each other, in that a subset of them meets the service requirements with joint efforts. A conjunctive operator (AND) suggest that all service alternatives are needed to fulfill the requirements.

In the FIG. 4 example eEPC, a first event 402 calls a function 404, which leads to a second event 406. However, before the second event 406 can be run, the function 404 must be performed. In that regard, the function 404 has a service capability type 408. The configurational operator 410 in the FIG. 4 example is the disjunctive operator (XOR), signaling that only one of the potential service capabilities is to be selected at a time. That is, the XOR configurational operator 410 indicates the one of a manual service capability 412 (that calls upon a human resource 414), an automated service capability 416 (that calls upon a software resource 418), or a semi-automated service capability 420 (that calls on both software and human resources 422 and 424) is to be used as the service capability type 408 associated with the function 404.

Service-oriented process configuration advantageously accommodates the hybrid nature of a service-oriented business process system. For example, it allows for flexibly choosing among service institutionalization alternatives before (ex ante) or during process runtime (ad hoc). Having specified required service capabilities in a top-down fashion from process requirements and available service capabilities in a bottom-up fashion from the IT landscape, an SOA analyst may match those two pools of information. Service matchmaking, or matching consumer needs with provider capabilities, is an aspect of the SOA notion. This corresponds to the view of SOA as a hybrid process system that separates process structure from process institutionalization. From the perspective of service consumption, service matching involves service discovery which, in turn, involves locating a machine-processable description of a web service related resource that may have been previously unknown and that meets certain functional criteria. One aspect involves finding an appropriate service related resource.

Successful results of the matching (e.g., exact matches and semi-matches) may be documented for future reference. It is unlikely to come up with only one-to-one mappings between service candidate capabilities and available service capabilities. Thus, in the likely event that multiple matches or semi-matches are returned, they may be merged by configurational operators. Consider the following examples:

Matching service capabilities are equal institutionalization alternatives for the required service capability. A disjunctive operator connecting them indicates that exactly one of them is to be deployed.

Semi-matching service capabilities complement each other in the effort to meet the required capability. A conjunctive operator demonstrates that they all are needed to perform the functionality.

A mix of matches and semi-matches (with overlapping and redundancies) connected by an adjunctive operator may be deployed to support a human task. Their enactment may be decided upon at runtime by the user.

Ad hoc configuration according to certain example embodiments involves some configuration logic per process activity that explains how a final service institutionalization is derived. Whereas process logic may determine the control flow by the status of the process object (e.g., invoice correct, invoice incorrect, etc.), configuration logic may provide non-functional criteria concerning the eligibility of a service alternative for a specific business situation (e.g., availability, cost, etc.). Adequate combinations of ex ante versus ad hoc configuration may help mitigate the trade-off between process reliability (e.g., robustness) and process flexibility. Ad hoc configuration may be an economic option if the institutionalization process can be automated in certain example scenarios. If human problem-solving is required to determine an adequate service institutionalization, throughput time may suffer from that ad hoc configuration. Thus, the degree of automation of the institutionalization decision process may affect the recommended form of configuration. On the other hand, the less automated the process, e.g., the more manual activities exhibit a problem-solving character, the more relevant ad hoc institutionalization decisions may become.

Figure 5:
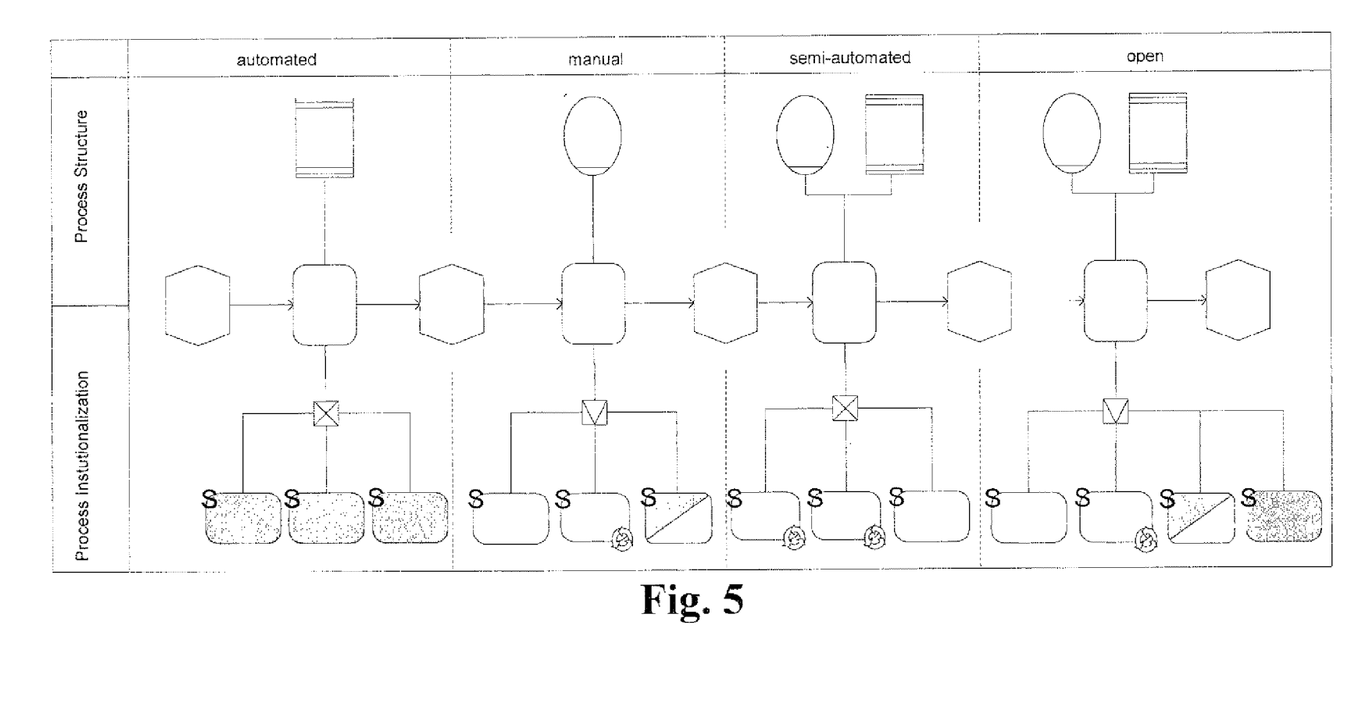
FIG. 5 illustrates the results of service matching being transferred from the service institutionalization diagram to the service-oriented business process models in accordance with certain example embodiments.

The results of service matching are transferred from the service institutionalization diagram to the service-oriented business process models as illustrated in FIG. 5. The service capabilities involved may be replaced by the matching services and their logical operators. Some integrity rules may be observed in this process. These integrity rules may include, for example:

Automated functions can only be assigned to disjunctive or conjunctive service capabilities.

Semi-automated functions require service capabilities to include human service capabilities and at least one interaction service capability.

The same applies to manual functions that only are to be assigned to adjunctive service capabilities leaving their deployment up to the user.

The three institutionalization operators may be configurational, such that they are resolved before the respective process step can be executed. A disjunctive operator indicates that services represent alternative forms of institutionalizations for an activity. It is resolved by selecting one service alternative and binding it to the service capability. In the case of a conjunctive operator, service institutionalization is specified by a service composition diagram that creates one composite service that is bound to the capability. Resolution of an adjunctive operator does not occur before the respective process activity is actually performed. The table below summarizes the configurational operators for service institutionalizations and their resolutions in accordance with certain example embodiments. To illustrate the underlying logic before runtime, a use case diagram may be assigned to the operator and offered to the user as a set of functionalities to pick from during runtime. All three forms of operator resolution may occur either ex ante (at design time) or at configuration time or ad hoc (during runtime).

| Operator | Type | Resolution Method |
| --- | --- | --- |
| Disjunctive | Alternative service institutionalization | Service selection and binding |
| Conjunctive | Complementary service institutionalization | Manual use case |
| Adjunctive | Composite service institutionalization | Service composition |

Referring once again to FIG. 5, it can be seen that automated, manual, semi-automated, and "open" functions are triggered by and trigger events. The example process structure for the automated function shown in FIG. 5 is a software or other automatic service resource, and the process institutionalization reflects a disjunctive (XOR) choice between one of plural automatic service capabilities. The example process structure for the manual function is a human service resource, and the process institutionalization reflects an adjunctive (OR) choice between one or more of manual or semi-automatic service capabilities. The example process structure for the semi-automatic function includes both automatic and human service resources, and the process institutionalization reflects a disjunctive (XOR) choice between one of plural manual resources. The example process structure for the open function includes both automatic and human service resources, and the process institutionalization reflects an adjunctive (OR) choice between one or more manual, automatic, and/or semi-automatic service capabilities.

Figure 6:
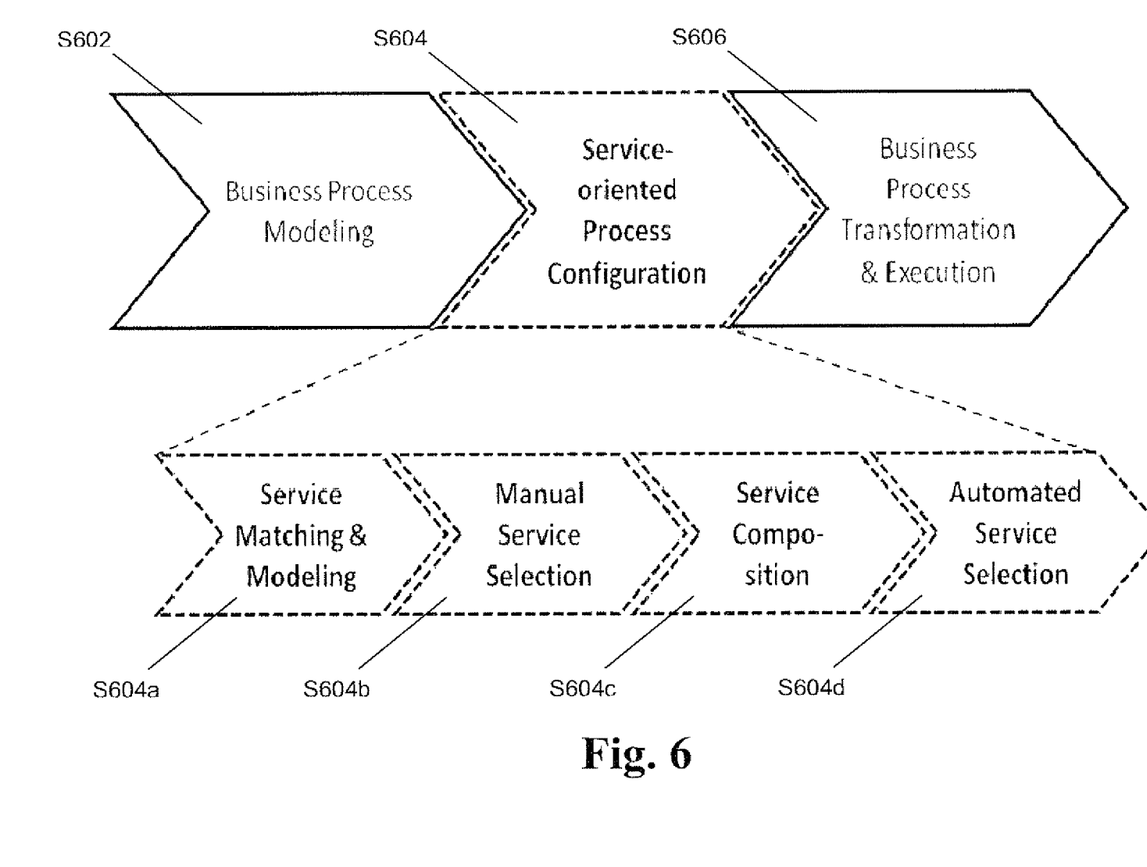
FIG. 6 illustrates an illustrative procedure and implementation plan of service-oriented process configuration according to certain example embodiments.

FIG. 6 illustrates an illustrative procedure and implementation plan of service-oriented process configuration according to certain example embodiments. As shown in FIG. 6, a business process is modeled (step S602), service-oriented process configuration takes place (step S604), and business process transformation and execution is carried out (S606). The implementation plan for the service-oriented process configuration step (step S604) is further broken down into service matching and modeling (step S604*a*), manual service selection (step S604*b*), service composition (step S604*c*), and automated service selection (step S604*d*). Example details of these sub-steps are provided below. It will be appreciated that manual service selection (step S604*b*) is an optional process. The example techniques shown and described in FIG. 6 may be implemented within the ARIS platform, the webMethods BPMS, or other suitable architectures in different example embodiments. It will be appreciated from the description herein that certain example embodiments relate to the addition of a service-oriented process configuration layer, which is made possible by enhancing the way that business processes are modeled visually or notationally, and through the implementation of a metamodel. With respect to the former, it will be appreciated that the model linking process steps and services may be extended so as to support logical operators, rules or constraints for matching process steps and services, dependencies and relationships, etc. With respect to the latter, it will be appreciated that a meta model may be provided so as to provide support for evaluating or analyzing matches, sometimes automatically, at either or both of runtime and design time.

For configurational service matching, software functionality may be implemented in certain example embodiments that compares service requirements with services available and proposes resulting matches to the user. In certain example embodiments, as alluded to above, matches may be proposed and accepted automatically (e.g., without direct human supervision, instruction, and/or confirmation).

Serving as a query object on the service repository, the description of required service capabilities is compared against the description of available service capabilities. This comparison may be thought of as a form of brokering and thus may in certain example instances depend on a comparable description of the required service capabilities and the available service capabilities. Semantic and syntactical similarities of the two may indicate a match. Assuming that not only software services are to be matched but also human services, both categories may be addressed differently.

For software service descriptions, for example, one description standard for web services is the Web Service Description Language (WSDL). WSDL descriptions typically involve syntax and thus sometimes provide little insight into semantics of a service capability. They are therefore oftentimes complemented by the UDDI specification, which allows for structured and unstructured information. UDDI registry specifications support two goals with respect to service discovery. They address ex ante service discovery in that they enable human developers to find information about services they need to program software that interact with those services (manual service matching). On the other hand, they also facilitate ad hoc service discovery, enabling client programs to query the registry and dynamically bind their services of interest (automated service matching). The UDDI inquiry interface may be kept rather simple. To enable more sophisticated matchmaking presupposes that the descriptions are richer, e.g., characterization of the processes that services support (as in OWL-S or UDSL, which are still under development). Richer descriptions enable a more precise selection of services.

Human service matching differs from software service matching, as it is not only the human service capability that is to be discovered, but also the underlying human service resource that is to be assigned. Whereas human service discovery may be implemented just as software service discovery, the latter is addressed, for instance, by WS-HumanTask and BPEL4People specifications with several alternatives. For example, people may be assigned to a human task via logical groups, via literals, or via expressions. A logical group may represent a people query against a people directory at runtime (ad hoc configuration). The specifications listed above do not provide more details on the exact discovery and invocation mechanisms of this query. Literal assignments allow specifying of the user or the group directly by identifiers or names. Logical expressions returning either an instance of an organizational entity or of a user are another option. Different forms of people assignment may produce multiple potential owners of the task. Explicitly claiming a task, a potential owner becomes the actual owner of this task. Thus, a human task assignment may eventually be resolved by the human service resources themselves fitting to the requirements of self-organization as postulated for knowledge-intensive business processes.

Based on the modeling of service requirements and availabilities in service capability diagrams, required service capability types may be compared with available software service implementations. The comparison may match the semantics and syntax of capability names, as well as input and output parameters. The definition of a match may vary. Based on their semantic and syntactic equivalence exact and semi matches may occur.

Exact matches may occur when the requested service outputs are the same as the outputs provided by the service capability type, e.g., when all the outputs of the requests are matched against the outputs of the advertisement and all the inputs of the advertisement are matched against all the inputs of the request, e.g., when the service is capable of satisfying the needs of the requester and the requester provides all the inputs the matched service needs for its operation. Thus, if even one of the requested outputs is not matched against the outputs of the advertisement, the match fails. More lenient approaches, however, allow for semi-matching results that comply only with a subset of required service properties.

Semi-matches can be further differentiated as follows:
Plug-in matches occur when the requested output is subsumed by the provided outputs;
Subsuming matches occur when the requested output subsumes the provided outputs;

Overlapping matches occur when the requested output is met partially by a subset of the provided outputs; and Match failures occur when the overlapping of requested and provided output is too small.

Semi-matches may be augmented by process mediation or process composition. Process mediation may extract only the relevant output from plug-in matches. Subsuming matches may be composed to composite services providing the fully required functionality. Match failures may involve the pool of available services being extended by new custom-built, purchased, outsourced or subscribed services before a new iteration of service matching may be started.

To provide this service matching functionality to the user, a user interface (UI) may be provided. The user interface may enable one or more of: selecting service capability types (e.g., business services) and invoking a service matching inquiry on them (context menu), presenting service matching results for a specific service capability type (e.g., business service) in a list while indicating their matching degree (full and semi) visually, proposing logical rules that represent the relationship of selected services in context with the respective service capability type (e.g., business service), selecting service matching results and drop them on to the modeling canvas in order to document, etc.

The base architecture may be extended to support configurational service modeling, depending on the native capabilities of the base architecture itself. This may include, for example, the maintenance of new object types, relationship types, symbol types attribute types, etc. The same may be assigned to one or more model types that are considered adequate, as appropriate.

The logical matching rule may involve symbol types for disjunctive, conjunctive, and adjunctive rules. This rule object may be further annotated by attribute types. The attribute types in turn may specify parameters to resolve logical matching rules before or during process execution. This may be advantageous in the case of disjunctive relationships between multiple full service matches. Selection parameters may help determine criteria along which final service selection may be conducted (either manually or automated). Groups of attribute types may be provided, with such groups including, for example: quality-based selection parameters pertaining to performance, security, stability and deployability of services; cost-based selection parameters pertaining to pricing and billing models of services; social selection parameters pertaining to experiences shared by previous service users and trustworthiness of service providers; and/or the like.

To make the results of service matching not only documented in the conceptual process models but also transferable to technical process models (e.g., for automated service selection), a data exchange format may be derived.

Figure 7:
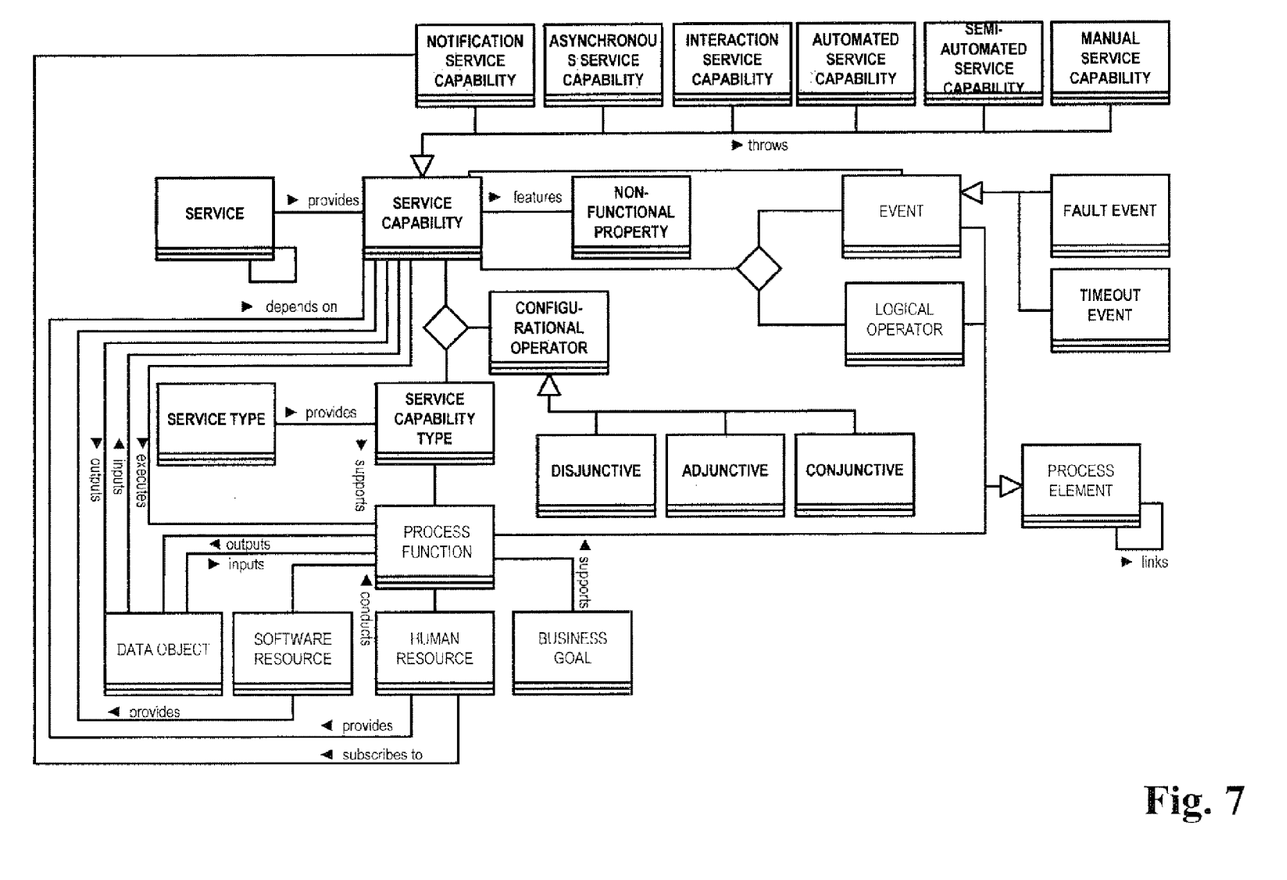
FIG. 7 is an illustrative meta-model for extending process modeling by service-oriented process configuration in accordance with certain example embodiments.

For both tasks (method extension and exchange format), the example meta-model of FIG. 7 provides a starting point for an illustrative implementation. In other words, FIG. 7 is an illustrative meta-model for extending process modeling by service-oriented process configuration in accordance with certain example embodiments. The meta model constructs a schema for the modeling language supporting service-oriented process configuration. It includes object types and their relationship types. Each object type may be represented by multiple symbol types. The white object types are common place for most process modeling language (especially the event-driven process chain), the shaded object types show example enhancements associated with the service-oriented process configuration described herein:

A SERVICE TYPE is a class of services that share the same SERVICE CAPABILITY TYPEs. The latter supports the execution of a process function, independent of the degree of automation. In that sense, a SERVICE TYPE and a SERVICE CAPABILITY TYPE serve as requirements specifications to describe what service support is needed to carry out a PROCESS FUNCTION.

A SERVICE CAPABILTY is an actually available service operation that belongs to an actually available SERVICE. While SERVICE (CAPABILTY) TYPES describe the target of a specific service support (to-be), SERVICEs (CAPABILITIES) represent the given service assets (as-is).

or more SERVICE CAPABILTY TYPES match one or more SERVICE CAPABILITIES, if they share the same functional properties in terms of input, output, and data processing, for example. These matches may not always be full matches, but rather may sometimes be semi-matches. In the likely case of a 1-to-n matching, a CONFIGURATIONAL OPERATOR indicates the logical relationship of those service capabilities and service capability type.

A CONFIGURATIONAL OPERATOR is a DISJUNCTIVE, ADJUNCTIVE, or CONJUNCTIVE operator.

A DISJUNCTIVE operator is a CONFIGURATIONAL OPERATOR that matches a SERVICE CAPABILITY TYPE with multiple SERVICE CAPABILITYs, where each fulfills the service requirements individually (for full matches). One of them is selected based on their NONFUNCTIONAL PROPERTY(ies) before or during run-time.

A CONJUNCTIVE operator is a CONFIGURATIONAL OPERATOR that matches a SERVICE CAPABILITY TYPE with multiple SERVICE CAPABILITY(ies) that fulfill the service requirements only partially (for semi-matches) and are combined to support the process step.

An ADJUNCTIVE operator is a CONFIGURATIONAL OPERATOR that connects both full- and semi-matches with a SERVICE CAPABILITY, but leaves their combination open (e.g., to the user or the respective situation at run).

Generally speaking, a SERVICE CAPABILTY may be further categorized. On the one hand, they may be divided by their degree of automation into AUTOMATED, SEMI-AUTOMATED, or MANUAL SERVICE CAPABILITYs. On the other hand, they may be typified by the way they interact technically with the user and/or process. For instance, A NOTIFICATION SERVICE CAPABILITY may only provide information about a change of state and thus may not provide any response (fire-and-forget). An ASYNCHRONOUS SERVICE CAPABILITY may be invoked and then asynchronously performed (without blocking the process flow) before delivering a result. An INTERACTIVE SERVICE CAPABILITY may interact synchronously with both user and process, e.g. the process flow is blocked until the service is performed and a response is provided.

With respect to manual and automated service selection, it is noted that disjunctive operators (XOR) may be resolved either manually or automatically. In both cases, a ranked list of preferred services available may be generated based on the parameters specified. For manual selection, the user interface may help the user browse preferred service matches and select and deploy one. For automated selection, the top-ranked service may be automatically chosen and deployed. The adjunctive operator (OR) may not be resolved unambiguously before process execution but instead may require situational parameters to be evaluated at runtime. Situational parameters may be gleaned from user interaction behavior and data availability. For example, this may be achieved by evaluating data input on user masks. If situational parameters cannot be derived automatically from the SO-BPS, additional user involvement comparable to the UI for manual service selection may be necessary or desirable.

With respect to service composition, it is noted that matching services connected with an AND-rule may only meet the requirements of the business services when being composed to a new service. Thus, conjunctive operators (AND) may signal a need for a new software service to be developed. Software support for conjunctive service matches therefore may include generating a service requirements specification based on the given semi-matching services and their business service requirement. This specification may be generated from a configurational process model and transferred to a service development environment or service repository in certain example embodiments, and it may represent a trigger for a new service engineering instance.

Figure 8:
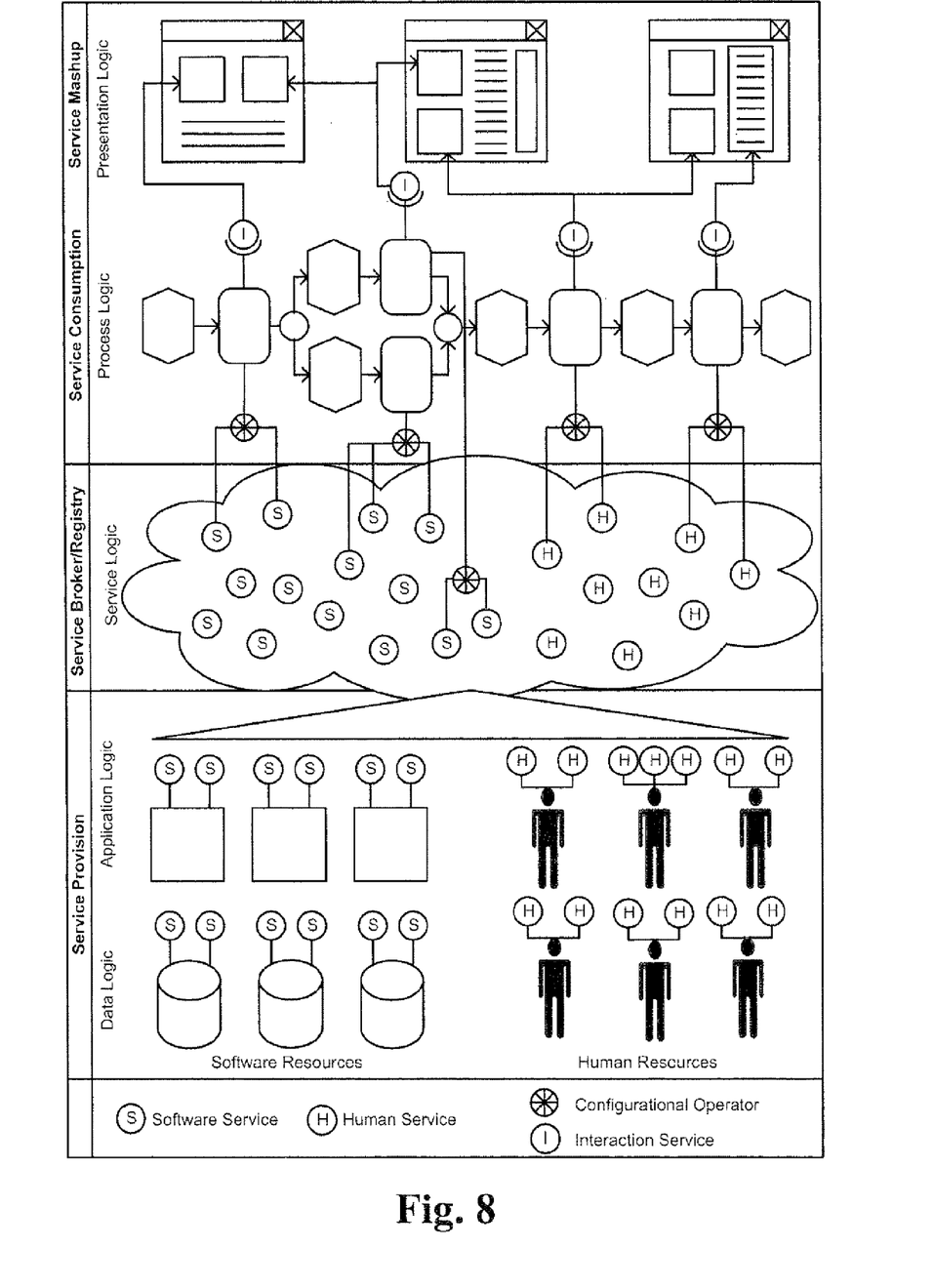
FIG. 8 is an illustrative architectural diagram in accordance with certain example embodiments.

FIG. 8 is an illustrative architectural diagram in accordance with certain example embodiments. As shown in FIG. 8, software resources include data logic and application logic and have associated software services, whereas human resources have associated human services. These resources and services are at least initially located at the bottom-most service provision layer. They may, however, be added to a service broker or registry. Presentation logic may result in displays, e.g., for users. The presentation logic may call interactive services that, in turn, cause events with associated functions according to process logic. As indicated above, the functions may be matched with services in the service broker or registry. Appropriate services may be selected in accordance with configurational operators, also as described above. It will be appreciated that the matching of functions to services may be performed ex ante or on an ad hoc basis in accordance with the techniques described herein.

It will be appreciated that as used herein, the terms system, subsystem, service, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having a processor execute instructions that may be tangibly stored on a computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for configuring a service-oriented business process system in which business process functions, events, and services are defined and transformed into a technical business process model, the method comprising:

at a process management system having at least one memory and at least one processor, the process management system interacting with heterogeneous and distributed software systems for executing parts of a process, the distributed software systems utilizing, at least, web-based services to participate in the process, the process management system configured to:

match business process functions to services to form an extended event-driven process chain (eEPC) by comparing semantic similarities and syntactical similarities between service requirements with services available from a service repository, each said service having an associated service capability and each said service capability having at least one associated service resource;

merge, when multiple matches are possible for a single business process function, the possible matches in accordance with a configurational operator, the configurational operator being one of a disjunctive operator, a conjunctive operator, and an adjunctive operator; and convert the eEPC to a service-oriented event-driven process chain (sEPC) by replacing service capabilities with the associated matching services and the associated configurational operator in accordance with integrity rules, wherein the integrity rules comprise allowing automated functions to be assigned to disjunctive or conjunctive service capabilities calling upon, at least, a software resource, allowing semi-automated functions to include human service capabilities calling upon, at least, a human resource, and at least one interaction service capability calling upon, at least, a software resource, and allowing manual functions to include human service capabilities calling upon, at least, a human resource, and to be assigned to adjunctive service capabilities such that deployment of manual functions is user-specified.

2. The method of claim 1, further comprising proposing matches that are presented to a user for selection during said matching.

3. The method of claim 1, wherein software services are matched according to a first matching parameter and human services are matched according to a second matching parameter.

4. The method of claim 3, wherein comparisons relating to software services are based at least in part on WSDL descriptions and/or UDDI registry specifications.

5. The method of claim 4, wherein the WSDL descriptions involve syntax in association with a service capability.

6. The method of claim 4, wherein the UDDI registry specifications involve semantics in association with a service capability.

7. The method of claim 4, wherein the UDDI registry supports, at least, ad hoc service discovery enabling client programs to query the UDDI registry and dynamically bind services.

8. The method of claim 1, wherein comparisons relating to human services are based at least in part on WS-Human-Task and/or BPEL4People specifications.

9. The method of claim 1, wherein people are assigned to a human task via logical groups, literals, or expressions.

10. The method of claim 1, wherein matches are classified as either exact matches when requested service outputs are the same as outputs provided by the service capability type, or semi-matches.

11. The method of claim 10, wherein semi-matches are further classified as being one of plug-in matches where requested output is subsumed by provided outputs, subsuming matches where requested output subsumes provided outputs, overlapping matches where requested output is met partially by a subset of provided outputs, and match failures where overlapping of requested and provided output is below a predefined threshold.

12. The method of claim 11, further comprising providing a user interface enabling a user to select service capability types and invoke a service matching inquiry on them, present service matching results for a specific service capability type along with a matching degree, propose logical rules that represent the relationship of selected services in context with the respective service capability type, and document service matching results.

13. The method of claim 1, further comprising enabling service modeling in connection with a predefined metamodel supporting logical mapping rules.

14. The method of claim 1, wherein the method is performable ex ante at design time and/or ad hoc at run time.

15. The method of claim 1, wherein an n-to-m relationship between the business process functions and the services is established.

16. The method of claim 15, further comprising identifying and resolving configurational dependencies between the associated matching services supporting future designs and dynamic changes at runtime.

17. A method for running a service-oriented business process system in which business events and services are defined, the method comprising:
at a process management system having at least one memory and at least one processor, the process management system interacting with heterogeneous and distributed software systems for executing parts of a process, the distributed software systems utilizing, at least, web-based services to participate in the process, the process management system configured to:
match business process functions to services to form an extended event-driven process chain (eEPC) by comparing semantic similarities and syntactical similarities between service requirements with services available from a service repository, each said service having an associated service capability and each said service capability having at least one associated service resource;
merge, when multiple matches are possible for a single business process function, the possible matches in accordance with a configurational operator, the configurational operator being one of a disjunctive operator, a conjunctive operator, and an adjunctive operator;
convert the eEPC to a service-oriented event-driven process chain (sEPC) by replacing service capabilities with the associated matching services and the associated configurational operator in accordance with integrity rules; and
execute, when a business event is to be triggered, the matching service if there are no associated configurational operators and otherwise resolving which service is to be executed in dependence on the associated configuration operator,
wherein the integrity rules comprise allowing automated functions to be assigned to disjunctive or conjunctive service capabilities calling upon, at least, a software resource, allowing semi-automated functions to include human service capabilities calling upon, at least, a human resource, and at least one interaction service capability calling upon, at least, a software resource, and allowing manual functions to include human service capabilities calling upon, at least, a human resource, and to be assigned to adjunctive service capabilities such that deployment of manual functions is user-specified.

18. The method of claim 17, further comprising employing resolution rules to determine at least one service to be executed.

19. The method of claim 18, wherein the resolution rules are based at least in part on the configurational operator associated with the matching service(s).

20. The method of claim 19, wherein the method is performable ex ante at design time and/or ad hoc at run time.

21. A non-transitory computer-readable storage medium comprising instructions that, when executed by at least one processor of an information processing system, cause the system to:
match business process functions to services to form an extended event-driven process chain (eEPC) by comparing semantic similarities and syntactical similarities between service requirements with services available from a service repository, each said service having an associated service capability and each said service capability having at least one associated service resource;
merge, when multiple matches are possible for a single business process function, the possible matches in accordance with a configurational operator, the configurational operator being one of a disjunctive operator, a conjunctive operator, and an adjunctive operator; and
convert the eEPC to a service-oriented event-driven process chain (sEPC) by replacing service capabilities with the associated matching services and the associated configurational operator in accordance with integrity rules,
wherein the integrity rules comprise allowing automated functions to be assigned to disjunctive or conjunctive service capabilities calling upon, at least, a software resource, allowing semi-automated functions to include human service capabilities calling upon, at least, a human resource, and at least one interaction service capability calling upon, at least, a software resource, and allowing manual functions to include human service capabilities calling upon, at least, a human resource, and to be assigned to adjunctive service capabilities such that deployment of manual functions is user-specified.

22. A non-transitory computer-readable storage medium comprising instructions that, when executed by at least one processor of an information processing system, cause the system to:
match business process functions to services to form an extended event-driven process chain (eEPC) by comparing semantic similarities and syntactical similarities between service requirements with services available from a service repository, each said service having an associated service capability and each said service capability having at least one associated service resource;
merge, when multiple matches are possible for a single business process function, the possible matches in accordance with a configurational operator, the configurational operator being one of a disjunctive operator, a conjunctive operator, and an adjunctive operator;

convert the eEPC to a service-oriented event-driven process chain (sEPC) by replacing service capabilities with the associated matching services and the associated configurational operator in accordance with integrity rules; and execute, when a business event is to be triggered, the matching service if there are no associated configurational operators and otherwise resolving which service is to be executed in dependence on the associated configuration operator, wherein the integrity rules comprise allowing automated functions to be assigned to disjunctive or conjunctive service capabilities calling upon, at least, a software resource, allowing semi-automated functions to include human service capabilities calling upon, at least, a human resource, and at least one interaction service capability calling upon, at least, a software resource, and allowing manual functions to include human service capabilities calling upon, at least, a human resource, and to be assigned to adjunctive service capabilities such that deployment of manual functions is user-specified.

23. A process management system interacting with heterogeneous and distributed software systems for executing parts of a process, the distributed software systems utilizing, at least, web-based services to participate in the process, the process management system comprising:

a data store stored in a memory of the system, the data store including predefined business events and services;

at least one processor configured to:

match business process functions to services to form an extended event process chain (eEPC) by comparing semantic similarities and syntactical similarities between service requirements with services available from a service repository, each said service having an associated service capability and each said service capability having at least one associated service resource;

merge, when multiple matches are possible for a single business process function, the possible matches in accordance with a configurational operator, the configurational operator being one of a disjunctive operator, a conjunctive operator, and an adjunctive operator; and convert the eEPC to a service-oriented event process chain (sEPC) by replacing service capabilities with the associated matching services and the associated configurational operator in accordance with integrity rules;

execute, when a business process function is to be triggered by a preceding business event, the associated matching service if there are no associated configurational operators and otherwise resolving, either ex ante or on an ad hoc basis, which service is to be executed in dependence on the associated configuration operator, wherein the integrity rules comprise allowing automated functions to be assigned to disjunctive or conjunctive service capabilities calling upon, at least, a software resource, allowing semi-automated functions to include human service capabilities calling upon, at least, a human resource, and at least one interaction service capability calling upon, at least, a software resource, and allowing manual functions to include human service capabilities calling upon, at least, a human resource, and to be assigned to adjunctive service capabilities such that deployment of manual functions is user-specified.

24. The system of claim 23, wherein the at least one processor is further configured to employ resolution rules to determine at least one service to be executed, the resolution rules being based at least in part on the configurational operator associated with the associated matching service.

25. The system of claim 23, wherein the at least one processor is further configured to perform comparisons relating to software services based at least in part on WSDL descriptions and/or UDDI registry specifications, as well as comparisons relating to human services based at least in part on WS-HumanTask and/or BPEL4People specifications.

26. The system of claim 23, wherein the at least one processor is further configured to classify matches as either exact matches when requested service outputs are the same as outputs provided by the service capability type, or semi-matches.

27. The system of claim 23, further comprising a user interface enabling a user to select service capability types and invoke a service matching inquiry on them, present service matching results for a specific service capability type along with a matching degree, propose logical rules that represent the relationship of selected services in context with the respective service capability type, and document service matching results.

28. The system of claim 23, further comprising a predefined metamodel supporting logical mapping rules supporting service modeling as enabled by the at least one processor.

* * * * *